(12) United States Patent
Hu et al.

(10) Patent No.: US 11,799,682 B2
(45) Date of Patent: Oct. 24, 2023

(54) OVEN APPLIANCE WITH SMART PROTECTED USER DETECTION

(71) Applicant: Haier US Appliance Solutions, Inc., Wilmington, DE (US)

(72) Inventors: Haitian Hu, Louisville, KY (US); Hairong Li, Louisville, KY (US); John Ouseph, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/698,054

(22) Filed: Mar. 18, 2022

(65) Prior Publication Data

US 2023/0299997 A1   Sep. 21, 2023

(51) Int. Cl.
  *H04L 12/28* (2006.01)
  *G06V 40/10* (2022.01)

(52) U.S. Cl.
  CPC ............ *H04L 12/282* (2013.01); *G06V 40/10* (2022.01); *H04L 12/2814* (2013.01); *H04L 12/2825* (2013.01); *H04L 2012/285* (2013.01)

(58) Field of Classification Search
  CPC ............... H04L 12/282; H04L 12/2814; H04L 12/2825; H04L 2012/285; G06V 40/10
  See application file for complete search history.

(56) References Cited

U.S. PATENT DOCUMENTS

| 6,720,880 | B2 | 4/2004 | Gutta et al. |
| 9,524,635 | B2 | 12/2016 | Fadell et al. |
| 9,946,273 | B2 | 4/2018 | Kusukame et al. |
| 2020/0266994 | A1* | 8/2020 | Drake ................. G06Q 20/401 |
| 2020/0367692 | A1 | 11/2020 | Stipe et al. |
| 2023/0025683 | A1* | 1/2023 | Songer ................. A47J 36/321 |

FOREIGN PATENT DOCUMENTS

| CN | 106060033 A | 10/2016 |
| CN | 107871118 A | 4/2018 |
| CN | 110310453 A | 10/2019 |
| CN | 112242018 A | 1/2021 |
| DE | 102017108063 A1 | 10/2018 |

\* cited by examiner

*Primary Examiner* — Tejal Gami
(74) *Attorney, Agent, or Firm* — Dority & Manning, P.A.

(57) ABSTRACT

A method of operating an oven appliance, where the oven appliance includes a camera assembly operable to obtain an image, is provided. The method includes downloading a protected user detection software from a remote computing device to the oven appliance. The method also includes initiating a cooking operation of the oven appliance. The method further includes detecting, with the camera assembly, a user at the oven appliance after initiating the cooking operation and using the protected user detection software to determine that the detected user is a protected user.

18 Claims, 6 Drawing Sheets

OVEN APPLIANCE WITH SMART PROTECTED USER DETECTION

FIELD OF THE INVENTION

The present subject matter relates generally to oven appliances, and more particularly to systems and methods for detecting protected users of such oven appliances.

BACKGROUND OF THE INVENTION

Oven appliances generally include a cabinet that defines a cooking chamber for cooking food items therein, such as by baking or broiling the food items. To heat the cooking chamber for cooking, oven appliances include one or more heating elements positioned in the cooking chamber, such as at a top portion, bottom portion, side portion, or combinations thereof, in the cooking chamber. Some oven appliances also include a convection heating element and fan for convection cooking cycles. The heating element or elements may be used for various cycles of the oven appliance, such as a preheat cycle, a cooking cycle, or a self-cleaning cycle. A cooktop may be provided on a top panel of the cabinet. The cooktop typically includes multiple heating elements or burners for receipt of cooking utensils thereon.

Because of the high temperatures generated by such heating elements and burners in the cooking chamber and/or on the cooktop, operation of the oven appliance by certain users may be undesirable.

Accordingly, an oven appliance with improved features for restricting or preventing protected users from operating the oven appliance unattended would be useful. More particularly, an oven appliance that is capable of identifying a protected user, and methods of identifying a protected user, would be useful.

BRIEF DESCRIPTION OF THE INVENTION

Aspects and advantages of the invention will be set forth in part in the following description, or may be apparent from the description, or may be learned through practice of the invention.

In an exemplary embodiment, a method of operating an oven appliance is provided. The oven appliance includes a camera assembly operable to obtain an image. The method includes downloading a protected user detection software from a remote computing device to the oven appliance. The method also includes initiating a cooking operation of the oven appliance. The method further includes detecting, with the camera assembly, a user at the oven appliance after initiating the cooking operation and determining that the detected user is a protected user using the protected user detection software.

In another exemplary embodiment, an oven appliance is provided. The oven appliance includes a camera assembly operable to obtain an image and a controller. The controller is operable for downloading a protected user detection software from a remote computing device to the oven appliance. The controller is also operable for initiating a cooking operation of the oven appliance. The controller is further operable for detecting, with the camera assembly, a user at the oven appliance after initiating the cooking operation and for determining that the detected user is a protected user using the protected user detection software.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
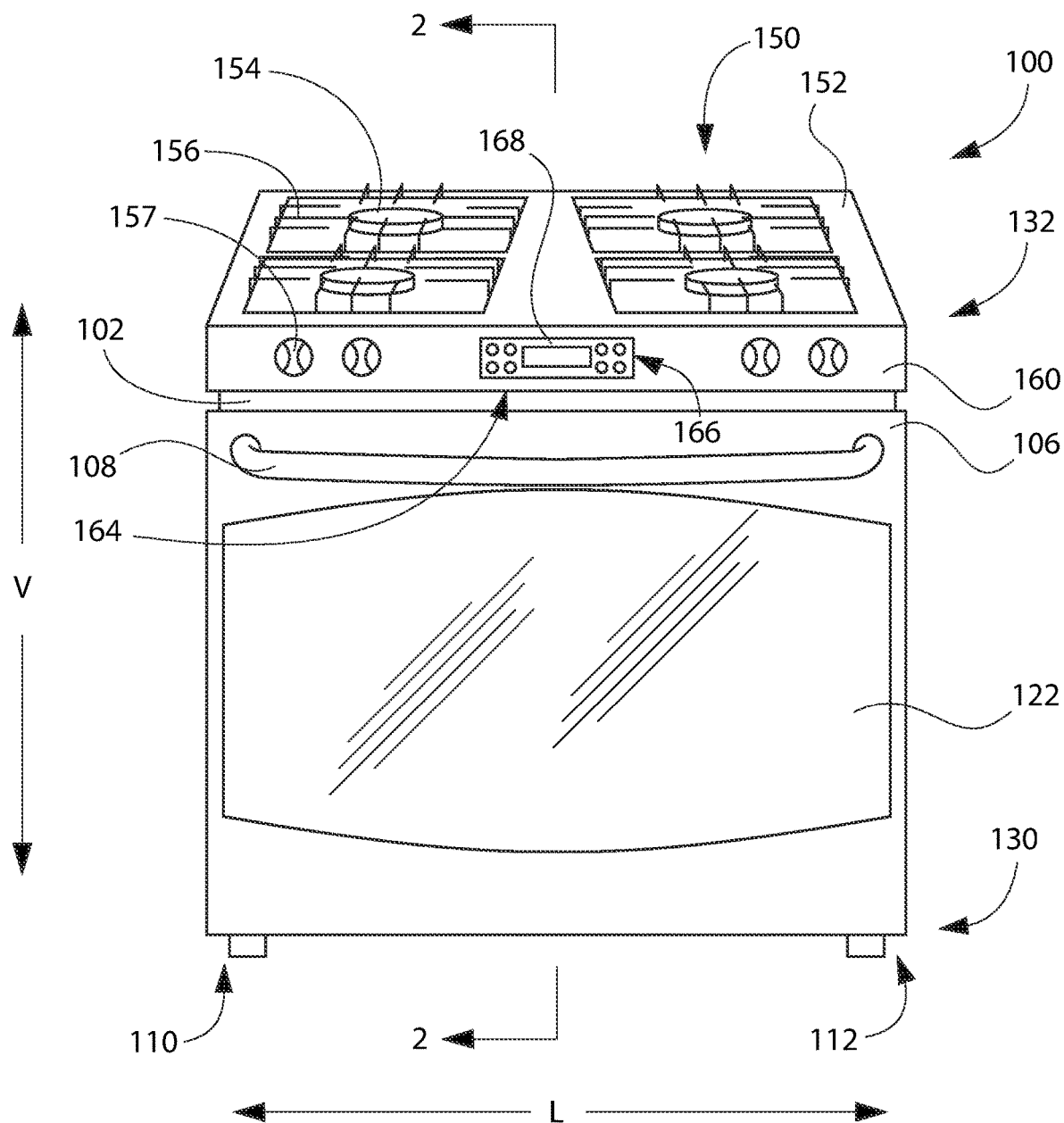
FIG. 1 provides a perspective view of an oven appliance according to one or more exemplary embodiments of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Directional terms such as "left" and "right" are used herein with reference to the perspective of a user standing in front of the oven appliance 100 to access the oven and/or items therein. Terms such as "inner" and "outer" refer to relative directions with respect to the interior and exterior of the oven appliance, and in particular the cooking chamber(s) defined therein. For example, "inner" or "inward" refers to the direction towards the interior of the oven appliance. Terms such as "left," "right," "front," "back," "top," or "bottom" are used with reference to the perspective of a user accessing the oven appliance. For example, a user stands in front of the oven appliance to open the door(s) and reaches into the cooking chamber(s) to add, move, or withdraw items therein.

As used herein, the terms "first," "second," and "third" may be used interchangeably to distinguish one component from another and are not intended to signify location or importance of the individual components. As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 2:
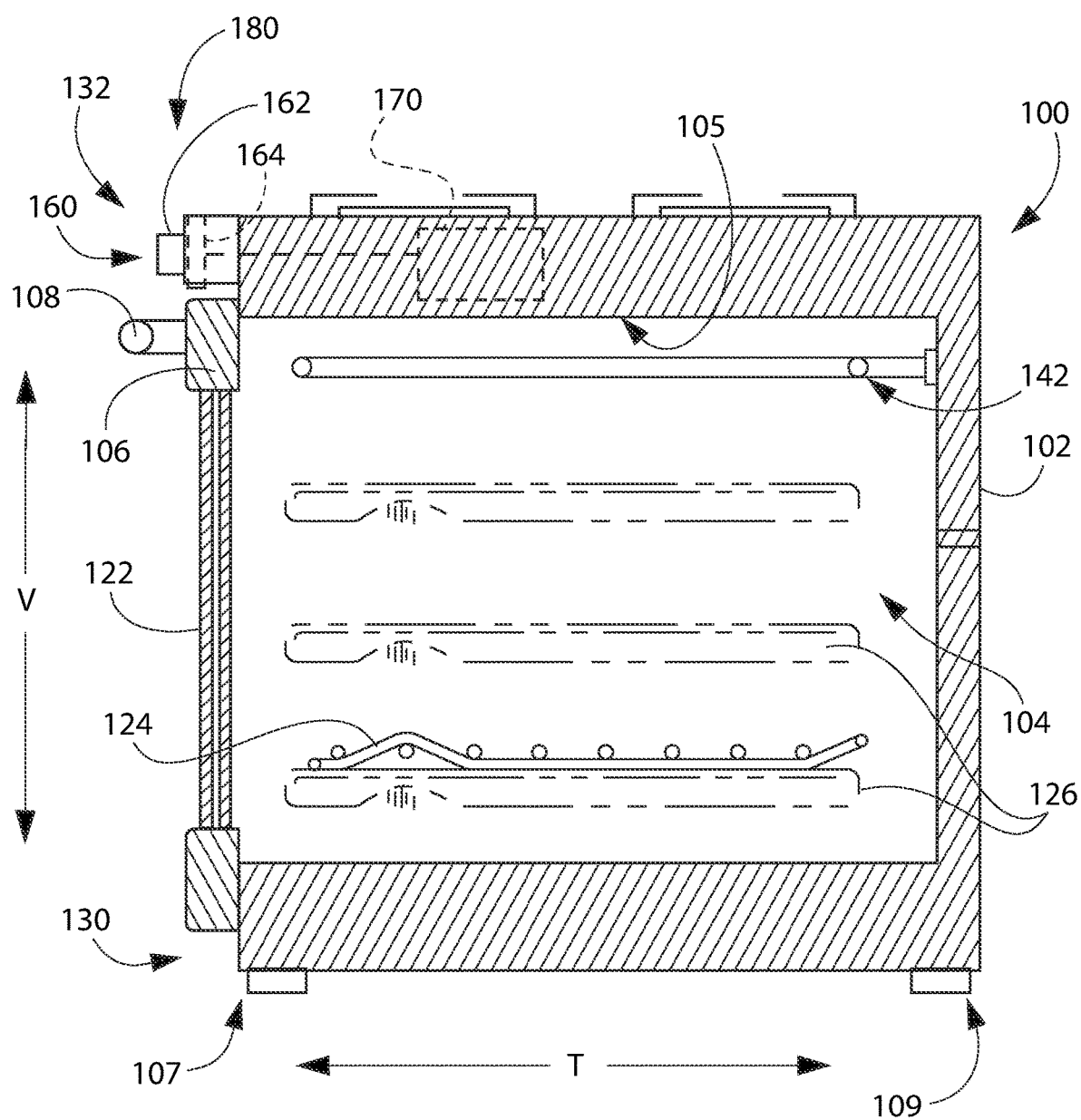
FIG. 2 provides a section view of the oven appliance of FIG. 1 taken along line 2-2 of FIG. 1.

FIG. 1 provides a front perspective view of an oven appliance 100 according to exemplary embodiments of the present subject matter. FIG. 2 provides a section view of exemplary oven appliance 100 taken along line 2-2 of FIG. 1. Oven appliance 100 is shown in FIGS. 1 and 2 as a free-standing range oven appliance, but it will be appreciated that oven appliance 100 is provided by way of example only and is not intended to limit the present subject matter in any aspect. Other cooking appliances having different configurations, different appearances, and/or different features may also be utilized with the present subject matter as well. Thus, the present subject matter may be used with other oven appliance configurations, e.g., wall ovens and/or oven appliances that define one or more interior cavities for the receipt of food items and/or having different pan or rack arrangements than what is shown in FIG. 2, as well as with cooktop-only appliances.

Oven appliance 100 includes an insulated cabinet 102 with an interior cooking chamber 104 defined by an interior surface 105 of cabinet 102. Cooking chamber 104 is configured for receipt of one or more food items to be cooked. Cabinet 102 extends between a bottom portion 130 and a top portion 132 along a vertical direction V. Cabinet 102 also extends between a front portion 107 and a back portion 109 along a transverse direction T and between a first side 110 and a second side 112 along a lateral direction L. Vertical direction V, lateral direction L, and transverse direction T are mutually perpendicular and form an orthogonal direction system.

Oven appliance 100 includes a door 106 rotatably mounted to cabinet 102, e.g., with a hinge (not shown). A handle 108 is mounted to door 106 and assists a user with opening and closing door 106. For example, a user can pull or push handle 108 to open or close door 106 to access cooking chamber 104. Oven appliance 100 includes a seal (not shown) between door 106 and cabinet 102 that maintains heat and cooking fumes within cooking chamber 104 when door 106 is closed as shown in FIGS. 1 and 2. Multiple parallel glass panes 122 provide for viewing the contents of cooking chamber 104 when door 106 is closed and provide insulation for cooking chamber 104. A baking rack 124 is positioned in cooking chamber 104 for receipt of food items or utensils containing food items. Baking rack 124 is slidably received onto embossed ribs or sliding rails 126 such that rack 124 may be conveniently moved into and out of cooking chamber 104 when door 106 is open.

A top heating element or broil element 142 is positioned in cooking chamber 104 of cabinet 102 proximate top portion 132 of cabinet 102. Top heating element 142 is used to heat cooking chamber 104 for both cooking/broiling and cleaning of oven appliance 100. Like heating assembly 140, the size and heat output of top heating element 142 can be selected based on, e.g., the size of oven appliance 100. In the exemplary embodiment shown in FIG. 2, top heating element 142 is shown as an electric resistance heating element.

As shown in FIG. 1, oven appliance 100 includes a cooktop 150. Cooktop 150 is disposed on and is attached to or integral with cabinet 102. Cooktop 150 includes a top panel 152, which by way of example may be constructed of glass, ceramics, enameled steel, or combinations thereof. One or more burners 154 extend through top panel 152. A utensil (e.g., pots, pans, etc.) holding food and/or cooking liquids (e.g., oil, water, etc.) may be placed onto grates 156 disposed adjacent burners 154. Burners 154 provide thermal energy to cooking utensils placed on grates 156. Burners 154 can be any suitable type of burners, including e.g., gas, electric, electromagnetic, a combination of the foregoing, etc. It will be appreciated that the configuration of cooktop 150 is provided by way of example only and that other suitable configurations are contemplated.

Oven appliance 100 includes a user interface panel 160. For this exemplary embodiment, user interface panel 160 includes a number of knobs 162 that each correspond to one of the burners 154. Knobs 162 allow users to activate each burner 154 and to determine the amount of heat input provided by each burner 154 to a cooking utensil located thereon.

User interface panel 160 also includes a control panel 164 that provides visual information to a user and allows the user to select various operational features for the operation of oven appliance 100 via one or more user inputs 166. One or more of a variety of electrical, mechanical or electro-mechanical input devices including rotary dials, push buttons, toggle/rocker switches, and/or touch pads can also be used singularly or in combination as user inputs 166.

A display 168 of control panel 164 may present certain information to users, such as, e.g., whether a particular burner 154 is activated and/or the level at which the burner 154 is set. Display 168 can be a touch sensitive component (e.g., a touch-sensitive display screen or a touch pad) that is sensitive to the touch of a user input object (e.g., a finger or a stylus). Display 168 may include one or more graphical user interfaces that allow for a user to select or manipulate various operational features of oven appliance 100 or its cooktop 150.

Referring now specifically to FIG. 2, the operation of oven appliance 100 is controlled by a processing device or controller 170. As shown, controller 170 is communicatively coupled with control panel 164 and its user inputs 166. Controller 170 may also be communicatively coupled with various operational components of oven appliance 100 as well, such as heating assembly 140, e.g., heating element 142, knobs 162, temperature sensors, cameras, speakers, and microphones, etc. Input/output ("I/O") signals may be routed between controller 170 and the various operational components of oven appliance 100. Thus, controller 170 can selectively activate and operate these various components. Various components of oven appliance 100 are communicatively coupled with controller 170 via one or more communication lines 172, such as, e.g., signal lines, shared communication busses, or wirelessly.

Controller 170 includes one or more memory devices and one or more processors (not labeled). The processors can be any combination of general or special purpose processors, CPUs, or the like that can execute programming instructions or control code associated with operation of oven appliance 100. The memory devices may represent random access memory such as DRAM or read only memory such as ROM or FLASH. In one embodiment, the processor executes programming instructions stored in memory. The memory may be a separate component from the processor or may be included onboard within the processor. Alternatively, controller 170 may be constructed without using a processor, e.g., using a combination of discrete analog and/or digital logic circuitry (such as switches, amplifiers, integrators, comparators, flip-flops, AND gates, and the like) to perform control functionality instead of relying upon software. Controller 170 may include a network interface such that controller 170 can connect to and communicate over one or more networks with one or more network nodes. Controller 170 can also include one or more transmitting, receiving, and/or transceiving components for transmitting/receiving communications with other devices communicatively coupled with oven appliance 100. Additionally or alternatively, one or more transmitting, receiving, and/or transceiving components can be located off board controller 170. Controller 170 can be positioned in a variety of locations throughout oven appliance 100. For this embodiment, controller 170 is located proximate user interface panel 160 toward top portion 132 of oven appliance 100.

Control panel 164, including user inputs 166 and display 168, and knobs 162 collectively make up a user interface 180 of oven appliance 100. User interface 180 provides a means for users to communicate with and operate oven appliance 100. It will be appreciated that other components or devices that provide for communication with oven appliance 100 for operating oven appliance 100 may also be included in user interface. For example, user interface 180 may include a speaker, a microphone, a camera or motion detection camera for detecting a user's proximity to oven appliance 100 or for picking up certain motions, and/or other user interface elements in various combinations.

As will be described in more detail below, oven appliance 100 may further include features that are generally configured to detect the presence and identity of a user, in particular of a protected user. More specifically, such features may include one or more sensors, e.g., cameras 192 (see, e.g., FIG. 3), or other detection devices that are used to monitor the oven appliance 100 and an area in front of the cabinet 102, such as an area in which a user accessing the cooking chamber 104 and/or cooktop 150 is likely to be present. The sensors or other detection devices may be operable to detect and monitor presence of one or more users that are accessing the oven appliance 100, and in particular the cooking chamber 104 and/or cooktop 150 thereof. In this regard, the oven appliance 100 may use data from each of these devices to obtain a representation or knowledge of the identity, position, and/or other qualitative or quantitative characteristics of one or more users.

Figure 3:
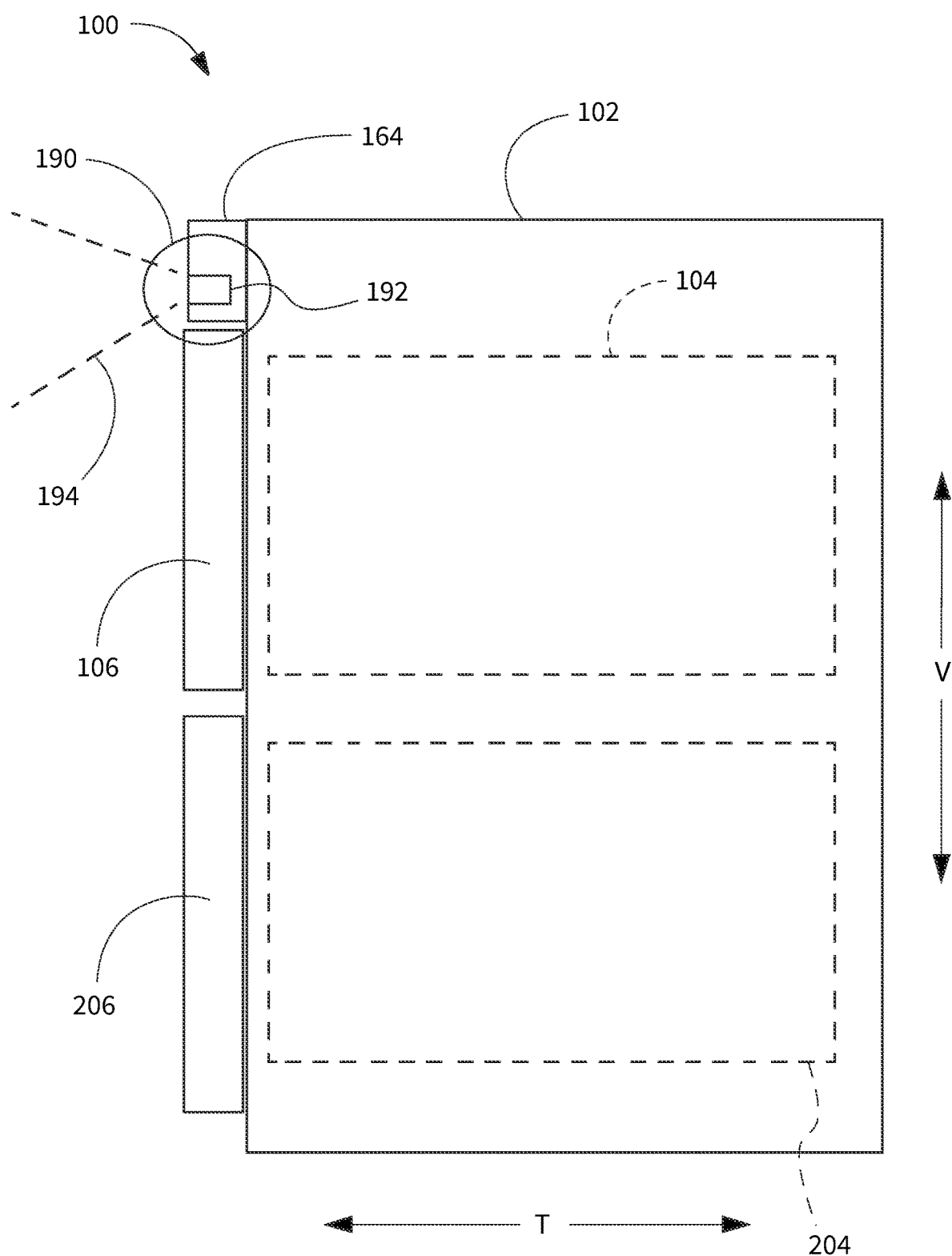
FIG. 3 provides a diagrammatic illustration of a camera assembly in an oven appliance according to one or more exemplary embodiments of the present subject matter.

As shown schematically in FIG. 3, the user detection system may include a camera assembly 190 that is generally positioned and configured for obtaining images of oven appliance 100 and adjoining areas, e.g., in front of the oven appliance 100, during operation of the camera assembly 190. Specifically, according to the illustrated embodiments in FIG. 3, camera assembly 190 includes one or more cameras 192. The one or more cameras 192 may be mounted to cabinet 102, to door 106, or otherwise positioned in view of cooking chamber 104, and/or an area in front of the cabinet 102 that is contiguous with the cooking chamber 104 when the door 106 is open. As shown in FIG. 3, a camera 192 of camera assembly 190 is mounted to control panel 164 at the front portion 107 of cabinet 102 and is forward-facing, e.g., is oriented to have a field of vision or field of view 194 directed towards an area in front of the cabinet 102, such as directly and immediately in front of the cabinet 102.

As noted above, the configuration of oven appliance 100 illustrated in FIGS. 1 and 2 is by way of example only, and aspects of the present disclosure may also be used with other cooking appliances, such as cooktop appliances, wall ovens, or various other oven appliances having different heating elements, such as gas burners on the cooktop and/or one or more gas heating elements in the cooking chamber, or other heating elements, as well as variations in the number or size of burners, or variations in the location, position, or type of controls on the user interface, among numerous other possible variations in the configuration of the oven appliance 100 within the scope of the present disclosure. For example, FIG. 3 illustrates an exemplary embodiment of the oven appliance 100 which includes a second cooking chamber 204 defined in the cabinet 102 with as second door 206 associated with the second cooking chamber 204, e.g., FIG. 3 illustrates an exemplary double oven embodiment.

Although a single camera 192 is illustrated in FIG. 3, it should be appreciated that camera assembly 190 may include a plurality of cameras 192, wherein each of the plurality of cameras 192 has a specified monitoring zone or range positioned in and/or around oven appliance 100, such as multiple cameras in or facing towards the cooking chamber 104, such as in the door 106 or second door 206, and/or a second forward-facing camera, e.g., in between the cooking chamber 104 and the second cooking chamber 204 along the vertical direction V. In this regard, for example, the field of view 194 of each camera 192 may be limited to or focused on a specific area.

In some embodiments, it may be desirable to activate the camera or cameras 192 for limited time durations and only in response to certain triggers. For example, a proximity sensor, such as an infrared (IR) camera, may be provided such that the camera 192 is only activated after the proximity sensor detects motion at the front of the oven appliance 100. In additional embodiments, the activation of the camera 192 may be in response to a door opening, such as detecting that the door 106 or second door 206 was opened using a door switch. In this manner, privacy concerns related to obtaining images of the user of the oven appliance 100 may be mitigated. According to exemplary embodiments, camera assembly 190 may be used to facilitate a user detection and/or identification process for oven appliance 100. As such, each camera 192 may be positioned and oriented to monitor one or more areas of the oven appliance 100 and adjoining areas, such as while a user is accessing or attempting to access the oven appliance 100.

It should be appreciated that according to alternative embodiments, camera assembly 190 may include any suitable number, type, size, and configuration of camera(s) 192 for obtaining images of any suitable areas or regions within or around oven appliance 100. In addition, it should be appreciated that each camera 192 may include features for adjusting the field of view and/or orientation.

It should be appreciated that the images obtained by camera assembly 190 may vary in number, frequency, angle, resolution, detail, etc. in order to improve the clarity of the particular regions surrounding or within oven appliance 100. In addition, according to exemplary embodiments, controller 134 may be configured for illuminating the cooking chamber 104 using one or more light sources prior to obtaining images. Notably, controller 134 of oven appliance 100 (or any other suitable dedicated controller) may be communicatively coupled to camera assembly 190 and may be programmed or configured for analyzing the images obtained by camera assembly 190, e.g., in order to detect and/or identify a user proximate to the oven appliance 100, as described in more detail below.

In general, controller 170 may be operably coupled to camera assembly 190 for analyzing one or more images obtained by camera assembly 190 to extract useful information regarding objects or people within the field of view of the one or more cameras 192. In this regard, for example, images obtained by camera assembly 190 may be used to extract a facial image or other identifying information related to one or more users. Notably, this analysis may be performed locally (e.g., on controller 170) or may be transmitted to a remote server (e.g., in the "cloud," as those of ordinary skill in the art will recognize as referring to a remote server or database in a distributed computing environment including at least one remote computing device) for analysis. Such analysis is intended to facilitate user detection, e.g., by identifying a user accessing the oven appliance, such as a user who may be operating, e.g., activating or adjusting, one or more burners on the cooktop or heating elements in the cooking chamber. As will be described in more detail below, such identification may also include determining whether the user is a protected user such as a child, an elderly or infirm person, a disabled person, etc.

Specifically, according to an exemplary embodiment as illustrated in FIG. 3, camera 192 (or multiple cameras 192 in the camera assembly 190 collectively) may be oriented away from a center of cabinet 102 and define a field of view 194 (e.g., as shown schematically in FIG. 3) that covers an area in front of cabinet 102. In this manner, the field of view 194 of camera 192, and the resulting images obtained, may capture any motion or movement of a user accessing or operating the oven appliance. The images obtained by camera assembly 190 may include one or more still images, one or more video clips, or any other suitable type and number of images suitable for detection and/or identification of a user.

Notably, camera assembly 190 may obtain images upon any suitable trigger, such as a time-based imaging schedule where camera assembly 190 periodically images and monitors the field of view, e.g., in and/or in front of the oven appliance 100. According to still other embodiments, camera assembly 190 may periodically take low-resolution images until motion (such as approaching the oven appliance, opening the door 106, or reaching for one of the knobs 157) is detected (e.g., via image differentiation of low-resolution images), at which time one or more high-resolution images may be obtained. According to still other embodiments, oven appliance 100 may include one or more motion sensors (e.g., optical, acoustic, electromagnetic, etc.) that are triggered when an object or user moves into or through the area in front of the oven appliance 100, and camera assembly 190 may be operably coupled to such motion sensors to obtain images of the object during such movement. In some embodiments, the camera assembly 190 may only obtain images when the oven appliance is activated, e.g., when one or more of the burners and/or heating elements is activated at a greater than zero level such that heat is emitted therefrom as would typically be used for heating (e.g., cooking) food, as will be understood by those of ordinary skill in the art. Thus, for example, when the oven appliance 100 is cooking, the camera assembly 190 may then continuously or periodically obtain images, or may apply the time-based imaging schedule, motion detection based imaging, or other imaging routines/schedules throughout the time that the oven appliance is cooking. Additionally, some components of the oven appliance, such as a glass cooktop, may retain heat after the cooking operation is complete. Thus, in some embodiments, the camera assembly 190 may continue to obtain images for a predetermined amount of time after the cooking is complete in order to allow such components of the oven appliance to cool off and/or to detect and respond to the presence of a protected user near the oven appliance while the oven appliance is still hot.

It should be appreciated that the images obtained by camera assembly 190 may vary in number, frequency, angle, resolution, detail, etc. in order to improve the clarity thereof. In addition, according to exemplary embodiments, controller 170 may be configured for illuminating a light (not shown) while obtaining the image or images. Other suitable imaging triggers are possible and within the scope of the present subject matter.

Using the teachings disclosed herein, one of skill in the art will understand that the present subject matter can be used with other types of ovens, e.g., as described above. Accordingly, other configurations of oven appliance 100 could be provided, it being understood that the configurations shown in the accompanying FIGS. and the description set forth herein are by way of example for illustrative purposes only.

Figure 4:
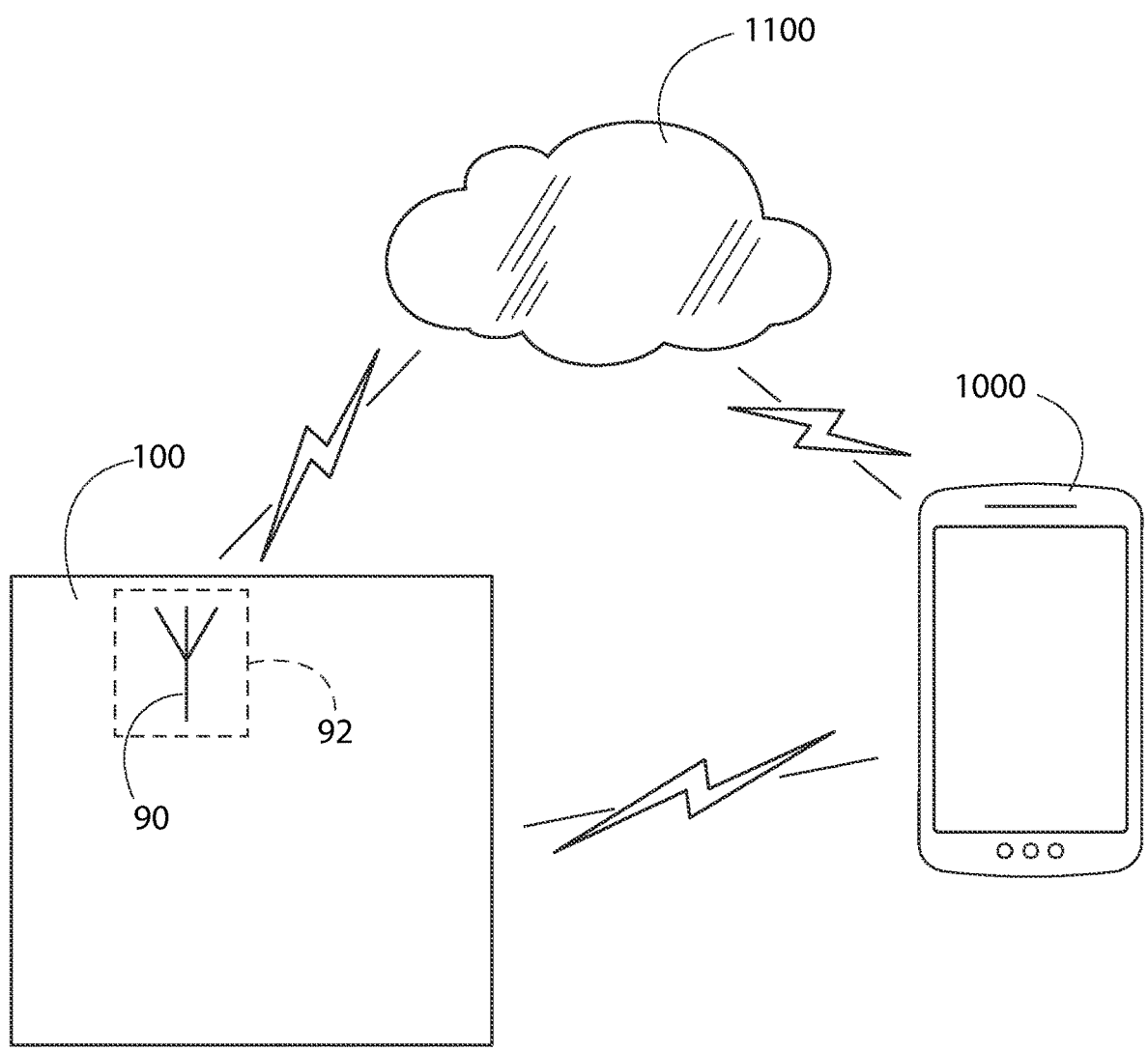
FIG. 4 provides a diagrammatic illustration of a an oven appliance in communication with a remote computing device and with a remote user interface device according to one or more exemplary embodiments of the present subject matter.

Turning now to FIG. 4, a general schematic is provided of an oven appliance 100, which communicates wirelessly with a remote user interface device 1000 and a network 1100. For example, as illustrated in FIG. 4, the oven appliance 100 may include an antenna 90 by which the oven appliance 100 communicates with, e.g., sends and receives signals to and from, the remote user interface device 1000. The antenna 90 may be part of, e.g., onboard, a communications module 92. The communications module 92 may be a wireless communications module operable to connect wirelessly, e.g., over the air, to one or more other devices via any suitable wireless communication protocol. For example, the communications module 92 may be a WI-FI® module, a BLUETOOTH® module, or a combination module providing both WI-FI® and BLUETOOTH® connectivity. The remote user interface device 1000 may be a laptop computer, smartphone, tablet, personal computer, wearable device, smart home system, and/or various other suitable devices.

The oven appliance 100 may be in communication with the remote user interface device 1000 device through various possible communication connections and interfaces. The oven appliance 100 and the remote user interface device 1000 may be matched in wireless communication, e.g., connected to the same wireless network. The oven appliance 100 may communicate with the remote user interface device 1000 via short-range radio such as BLUETOOTH® or any other suitable wireless network having a layer protocol architecture. As used herein, "short-range" may include ranges less than about ten meters and up to about one hundred meters. For example, the wireless network may be adapted for short-wavelength ultra-high frequency (UHF) communications in a band between 2.4 GHz and 2.485 GHz (e.g., according to the IEEE 802.15.1 standard). In particular, BLUETOOTH® Low Energy, e.g., BLUETOOTH® Version 4.0 or higher, may advantageously provide short-range wireless communication between the oven appliance 100 and the remote user interface device 1000. For example, BLUETOOTH® Low Energy may advantageously minimize the power consumed by the exemplary methods and devices described herein due to the low power networking protocol of BLUETOOTH® Low Energy.

The remote user interface device 1000 is "remote" at least in that it is spaced apart from and not physically connected to the oven appliance 100, e.g., the remote user interface device 1000 is a separate, stand-alone device from the oven appliance 100 which communicates with the oven appliance 100 wirelessly. Any suitable device separate from the oven appliance 100 that is configured to provide and/or receive communications, information, data, or commands from a user may serve as the remote user interface device 1000, such as a smartphone (e.g., as illustrated in FIG. 4), smart watch, personal computer, smart home system, or other similar device. For example, the remote user interface device 1000 may be a smartphone operable to store and run applications, also known as "apps," and some or all of the method steps disclosed herein may be performed by a smartphone app.

The remote user interface device 1000 may include a memory for storing and retrieving programming instructions. Thus, the remote user interface device 1000 may provide a remote user interface which may be an additional user interface to the user interface panel 160. For example, the remote user interface device 1000 may be a smartphone operable to store and run applications, also known as "apps," and the additional user interface may be provided as a smartphone app.

As mentioned above, the oven appliance 100 may also be configured to communicate wirelessly with a network 1100. The network 1100 may be, e.g., a cloud-based data storage system including one or more remote computing devices such as remote databases and/or remote servers, which may be collectively referred to as "the cloud." For example, the oven appliance 100 may communicate with the cloud 1100 over the Internet, which the oven appliance 100 may access via WI-FI®, such as from a WI-FI® access point in a user's home.

Now that the construction and configuration of oven appliance 100 have been presented according to an exemplary embodiment of the present subject matter, exemplary methods for operating an oven appliance, such as oven appliance 100, are provided. In this regard, for example, controller 170 may be configured for implementing some or all steps of one or more of the following exemplary methods. However, it should be appreciated that the exemplary methods are discussed herein only to describe exemplary aspects of the present subject matter, and are not intended to be limiting.

Figure 5:
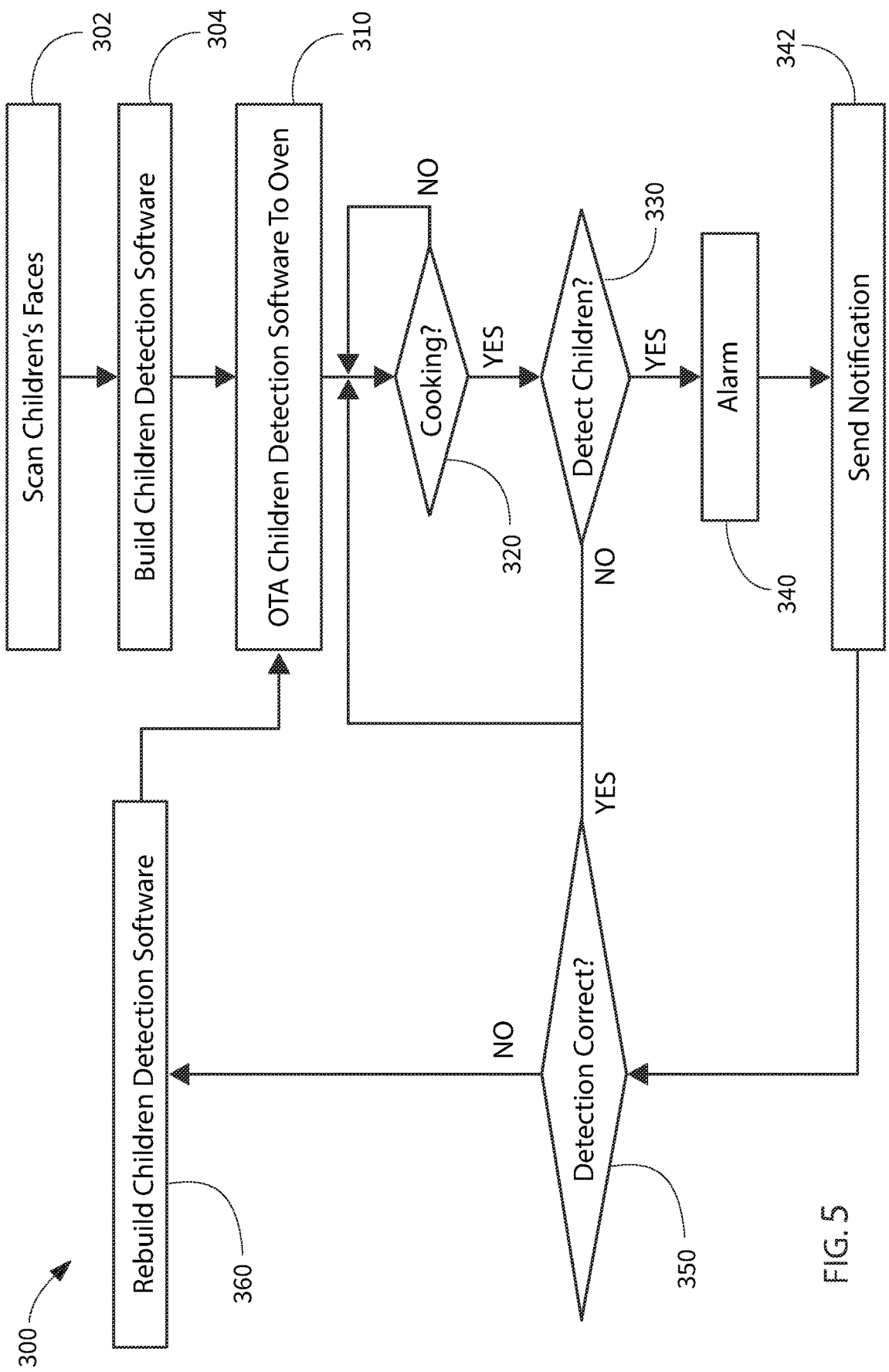
FIG. 5 provides a flow diagram of an exemplary method for operating an oven appliance according to one or more exemplary embodiments of the present subject matter.

An exemplary method 300 of operating an oven appliance is illustrated in FIG. 5. In FIG. 5 and the accompanying description, the protected users are children, by way of example. This example is provided for illustrative purposes only, the protected user or users in methods according to the present disclosure may include children, elderly persons, persons with physical and/or intellectual disability, or other users who may not be suitable for unsupervised or unassisted operation of the oven appliance.

As illustrated in FIG. 5, the method 300 may include an initial step 302 of scanning the protected users', e.g., children's, faces. For example, the protected users' faces may be scanned with a camera assembly of the oven appliance, e.g., such as the camera assembly described above with respect to FIG. 3, or a remote user interface device, e.g., as described above with respect to FIG. 4, or any other suitable image-capture device which can communicate (directly or indirectly) with the oven appliance and/or one or more remote computing devices. The scanned images of the face of one or more protected users, e.g., children, may then be uploaded to a database of faces, such as a remote database, such as in the cloud.

The database of protected users' faces may then be used, e.g., by the remote computing device, to build protected user detection software. Thus, method 300 may further include a step 310 of downloading the protected user detection software, such as over the air ("OTA"), e.g., wirelessly, from the remote computing device to the oven appliance.

As illustrated at step 320 in FIG. 5, when the oven appliance is cooking, e.g., when one or more heating elements or burners of the oven appliance are activated, e.g., energized or otherwise emitting heat, the method 300 may then begin searching for protected users. For example, as specifically illustrated in FIG. 5, the method 300 may include a determining step 320 of determining whether the oven appliance is cooking. When the oven appliance is not cooking, e.g., when the determination at step 320 in FIG. 5 is negative, the method 300 continues to monitor for cooking activity, e.g., loops back to step 320 as illustrated in FIG. 5.

When the oven appliance is cooking, e.g., when the determination at step 320 in FIG. 5 is positive, the method 300 then proceeds to detect protected users, e.g., children, e.g., as noted at step 330 in FIG. 5. Step 330 may include activating one or more cameras of a camera assembly of the oven appliance to obtain images of the oven appliance and/or areas proximate thereto, such as in front of the oven appliance, for example as described above with respect to FIG. 3.

If a protected user, e.g., child, is not detected at step 330, the method 300 may continue to iterate and continue to monitor for cooking activity and protected users, e.g., when the determination at step 330 in FIG. 5 is negative, the method 300 may loop back to step 320 as illustrated in FIG. 5. When a protected user is detected, e.g., when the determination at step 330 in FIG. 5 is positive, the method 300 may include one or more remedial actions. For example, such actions may include sounding an alarm, e.g., as illustrated at step 340 in FIG. 5, and/or sending a notification, e.g., as illustrated at step 342 in FIG. 5. For example, the alarm may be a local alarm, e.g., on the oven appliance. Also by way of example, the notification may be sent to a remote user interface device, such as a text message sent to a phone, an email which may be accessible on various devices, an audible notification broadcast from a smart speaker, or other suitable user notification. In particular, the local alarm may deter or repel the protected user from touching the oven appliance, and the user notification sent to the remote user interface device may inform an absent user of the presence of the protected user near the oven appliance while the oven appliance is cooking. The absent user may be, for example, an authorized or unprotected user, e.g., an adult, who may have left the kitchen and/or whose attention may have been diverted from the oven appliance and/or protected user.

Still referring to FIG. 5, the notification at step 342 may be accompanied by or followed by a verification or confirmation message or prompt, e.g., on the remote user interface device or on a local user interface of the oven appliance. If the detection is correct, e.g., if the protected user's identity is confirmed in response to the verification or confirmation message or prompt, then the method 300 may continue to monitor for cooking activity and protected users, e.g., may return to step 320 as illustrated in FIG. 5.

If, however, the protected user detection was not correct, e.g., when the determination at step 350 (such as the response to the confirmation request) is negative, then method 300 may include improving and/or updating the protected user detection software to reduce or avoid future false alarms. An incorrect detection may include, for example, identifying an unprotected user as a protected user or other false positive at the protected user detection step 330. The incorrect detection may be a learning opportunity, e.g., as described in the following, after being notified of the incorrect detection, the method may include updating or rebuilding the protected user detection software with data corresponding to the false positive, such that the oven appliance learns from the incorrect detection and improves the protected user detection after the incorrect detection. For example, when the result of step 350 is negative, the method 300 may then proceed to a step 360 of rebuilding or updating the protected user detection software, e.g., in the cloud. For example, the image or images obtained at step 330 may be transmitted from the oven appliance to the remote computing device at step 360, and such transmitted image or images may be used to rebuild the protected user detection software in response to the negative response received at the verification/confirmation step 350. For example, rebuilding the user detection software may include re-training a machine learning image recognition model (e.g., neural network), or otherwise updating and/or replacing an image processing, image analysis, and/or image recognition algorithm, examples of which are described in more detail below.

Figure 6:
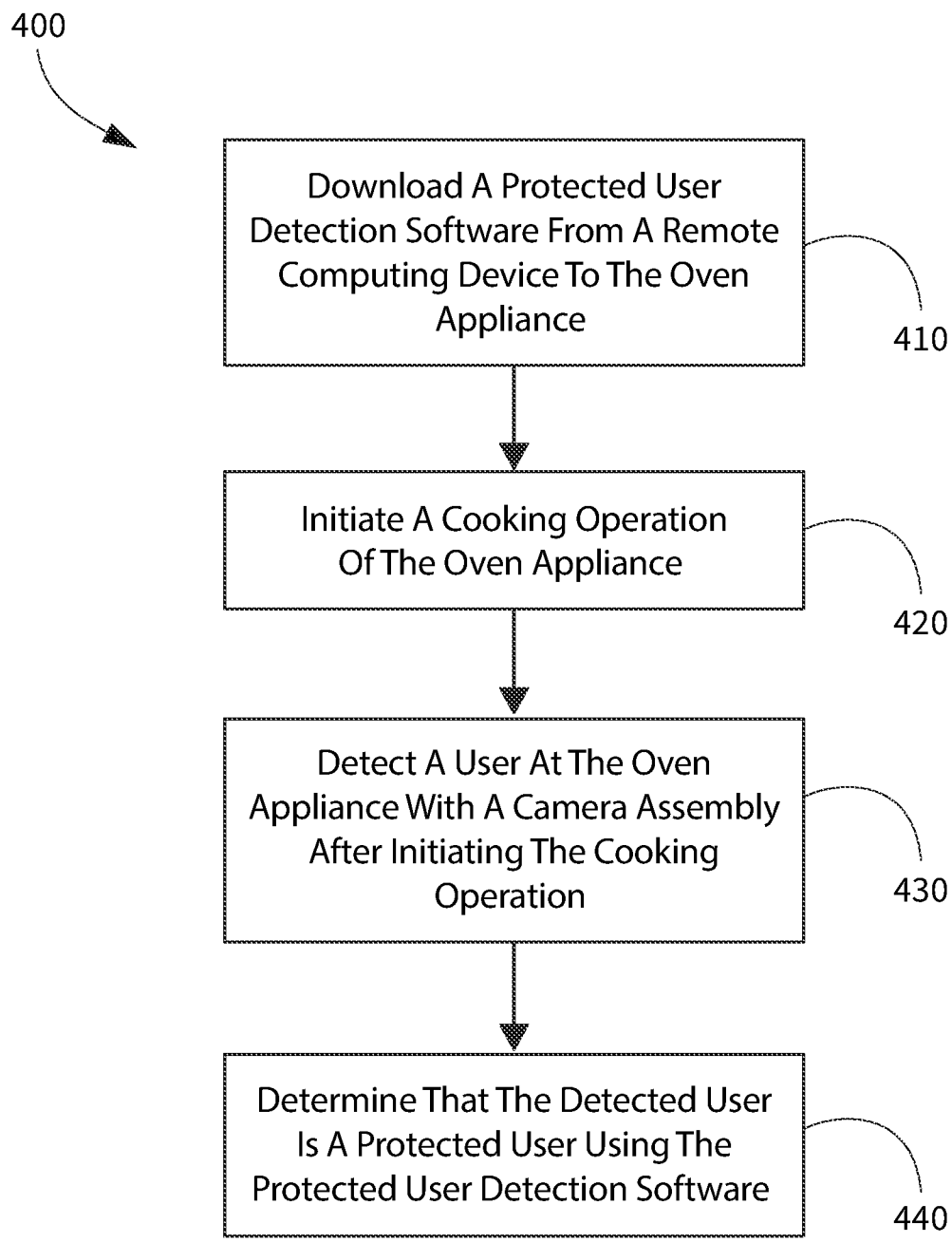
FIG. 6 provides a flow diagram of an additional exemplary method for operating an oven appliance according to one or more exemplary embodiments of the present subject matter.

Turning now to FIG. 6, embodiments of the present disclosure may include a method 400 of operating an oven appliance, such as the exemplary oven appliance 100 described above. For example, the oven appliance may include a camera assembly operable to obtain an image, such as but not limited to the camera assembly illustrated in FIG. 3 and described above.

As shown in FIG. 6, method 400 includes, at step 410, downloading a protected user detection software from a remote computing device to the oven appliance. As noted above, the remote computing device may include a remote database, remote server, and other similar devices, which may be a distributed computing network, such as may be referred to as "the cloud," or a part of such network.

Method 400 may also include a step 420 of initiating a cooking operation of the oven appliance. For example, initiating the cooking operation may include causing, e.g., by the controller 170 in response to a user input received at the control panel 164 or from a remote user interface device, one or more heating elements and/or burners of the oven appliance to emit heat, such as by igniting a flame (e.g., in a gas oven or cooktop with gas burners) or energizing a resistance heating element, etc.

Still referring to FIG. 6, method 400 may also include a step 430 of detecting, with the camera assembly, a user at the oven appliance after initiating the cooking operation. The detecting step 430 may include obtaining an image of a cooking chamber of the oven appliance and/or an adjoining area in front of the oven appliance using the camera assembly. For example, camera assembly 190 of oven appliance 100 may obtain an image within and/or in front of the oven appliance 100. In this regard, camera assembly 190 of oven appliance 100 may obtain one or more images of cooktop 150, cooking chamber 104, or any other zone or region within or around oven appliance 100.

Method 400 may further include a step 440 of determining that the detected user is a protected user. Such determination may be made using the protected user detection software. For example, steps 430 and 440 may include, and/or the oven appliance may be configured for, detecting or identifying one or more users, e.g., based on one or more images. In some embodiments, detection of the user(s) may be accomplished with the camera assembly 190. For example, the oven appliance may include a camera, and the method 400 may include and/or the oven appliance may be configured for capturing an image with the camera and detecting the user(s) based on the image captured by the camera. In some embodiments, the operation of the camera may be tied to the oven appliance cooking, e.g., the camera may be operable and configured to capture an image each time one or more of the burners and/or heating elements is activated. The structure and operation of cameras are understood by those of ordinary skill in the art and, as such, the camera is not illustrated or described in further detail herein for the sake of brevity and clarity. In such embodiments, the controller 170 of the oven appliance 100 may be configured for image-based processing, e.g., to detect a user and identify the user, e.g., determine whether the user is a protected user, based on an image of the user, e.g., a photograph taken with the camera(s) 192 of the camera assembly 190. For example, the controller 170 may be configured to identify the user by comparison of the image to a stored image of a known or previously-identified user. For example, controller 170 of oven appliance 100 (or any other suitable dedicated controller) may be communicatively coupled to camera assembly 190 and may be programmed or configured for analyzing the images obtained by camera assembly 190, e.g., in order to detect a user accessing or proximate to oven appliance 100 and to identify the user, e.g., determine whether the user is a protected user.

In some exemplary embodiments, the method 400 may include analyzing one or more images to detect and identify a user. It should be appreciated that this analysis may utilize any suitable image analysis techniques, image decomposition, image segmentation, image processing, etc. This analysis may be performed entirely by controller 170, may be offloaded to a remote server (e.g., in the cloud 1100) for analysis, may be analyzed with user assistance (e.g., via user interface 180), or may be analyzed in any other suitable manner. According to exemplary embodiments of the present subject matter, the analysis may include a machine learning image recognition process.

According to exemplary embodiments, this image analysis may use any suitable image processing technique, image recognition process, etc. As used herein, the terms "image analysis" and the like may be used generally to refer to any suitable method of observation, analysis, image decomposition, feature extraction, image classification, etc. of one or more images, videos, or other visual representations of an object. As explained in more detail below, this image analysis may include the implementation of image processing techniques, image recognition techniques, or any suitable combination thereof. In this regard, the image analysis may use any suitable image analysis software or algorithm to constantly or periodically monitor oven appliance 100 and/or a proximate and contiguous area in front of the oven appliance 100. It should be appreciated that this image analysis or processing may be performed locally (e.g., by controller 170) or remotely (e.g., by offloading image data to a remote server or network, e.g., in the cloud).

Specifically, the analysis of the one or more images may include implementation of an image processing algorithm. As used herein, the terms "image processing" and the like are generally intended to refer to any suitable methods or algorithms for analyzing images that do not rely on artificial intelligence or machine learning techniques (e.g., in contrast to the machine learning image recognition processes described below). For example, the image processing algorithm may rely on image differentiation, e.g., such as a pixel-by-pixel comparison of two sequential images. This comparison may help identify substantial differences between the sequentially obtained images, e.g., to identify movement, the presence of a particular object, the existence of a certain condition, etc. For example, one or more reference images may be obtained when a particular condition exists, and these references images may be stored for future comparison with images obtained during appliance operation. In a particular example, the reference images may be images of the face or faces of one or more protected users, e.g., in a database as described above in reference to FIG. 5, such that the extant particular condition in the reference images is the presence of a protected user. Similarities and/or differences between the reference image and the obtained image may be used to extract useful information for improving appliance performance. For example, image differentiation may be used to determine when a pixel level motion metric passes a predetermined motion threshold.

The processing algorithm may further include measures for isolating or eliminating noise in the image comparison, e.g., due to image resolution, data transmission errors, inconsistent lighting, or other imaging errors. By eliminating such noise, the image processing algorithms may improve accurate object detection, avoid erroneous object detection, and isolate the important object, region, or pattern within an image (the term "object" is used broadly herein to include humans, e.g., users of the oven appliance and protected users in particular). In addition, or alternatively, the image processing algorithms may use other suitable techniques for recognizing or identifying particular items or objects, such as edge matching, divide-and-conquer searching, greyscale matching, histograms of receptive field responses, or another suitable routine (e.g., executed at the controller 170 based on one or more captured images from one or more cameras). Other image processing techniques are possible and within the scope of the present subject matter.

In addition to the image processing techniques described above, the image analysis may include utilizing artificial intelligence ("AI"), such as a machine learning image recognition process, a neural network classification module, any other suitable artificial intelligence (AI) technique, and/or any other suitable image analysis techniques, examples of which will be described in more detail below. Moreover, each of the exemplary image analysis or evaluation processes described below may be used independently, collectively, or interchangeably to extract detailed information regarding the images being analyzed to facilitate performance of one or more methods described herein or to otherwise improve appliance operation. According to exemplary embodiments, any suitable number and combination of image processing, image recognition, or other image analysis techniques may be used to obtain an accurate analysis of the obtained images.

In this regard, the image recognition process may use any suitable artificial intelligence technique, for example, any suitable machine learning technique, or for example, any suitable deep learning technique. According to an exemplary embodiment, the image recognition process may include the implementation of a form of image recognition called region based convolutional neural network ("R-CNN") image recognition. Generally speaking, R-CNN may include taking an input image and extracting region proposals that include a potential object or region of an image. In this regard, a "region proposal" may be one or more regions in an image that could belong to a particular object (e.g., a human face, such as the face of a protected user) or may include adjacent regions that share common pixel characteristics. A convolutional neural network is then used to compute features from the region proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information—image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like, as opposed to a regular R-CNN architecture. For example, mask R-CNN may be based on fast R-CNN which is slightly different than R-CNN. For example, R-CNN first applies a convolutional neural network ("CNN") and then allocates it to zone recommendations on the covn5 property map instead of the initially split into zone recommendations. In addition, according to exemplary embodiments, standard CNN may be used to obtain, identify, or detect any other qualitative or quantitative data related to one or more objects or regions within the one or more images. In addition, a K-means algorithm may be used.

According to still other embodiments, the image recognition process may use any other suitable neural network process while remaining within the scope of the present subject matter. For example, the steps of detecting and identifying a user may include analyzing the one or more images using a deep belief network ("DBN") image recognition process. A DBN image recognition process may generally include stacking many individual unsupervised networks that use each network's hidden layer as the input for the next layer. According to still other embodiments, the step of analyzing one or more images may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence analysis techniques, and combinations of the above described methods or other known methods may be used while remaining within the scope of the present subject matter.

In addition, it should be appreciated that various transfer techniques may be used but use of such techniques is not required. If using transfer techniques learning, a neural network architecture may be pretrained such as VGG16/VGG19/ResNet50 with a public dataset then the last layer may be retrained with an appliance specific dataset. In addition, or alternatively, the image recognition process may include detection of certain conditions based on comparison of initial conditions, may rely on image subtraction techniques, image stacking techniques, image concatenation, etc. For example, the subtracted image may be used to train a neural network with multiple classes for future comparison and image classification.

It should be appreciated that the machine learning image recognition models may be actively trained by the appliance with new images, may be supplied with training data from the manufacturer or from another remote source, or may be trained in any other suitable manner. For example, according to exemplary embodiments, this image recognition process relies at least in part on a neural network trained with a plurality of images of the appliance in different configurations, experiencing different conditions, or being interacted with in different manners, such as by different users. This training data may be stored locally or remotely and may be communicated to a remote server for training other appliances and models.

It should be appreciated that image processing and machine learning image recognition processes may be used together to facilitate improved image analysis, object detection, or to extract other useful qualitative or quantitative data or information from the one or more images that may be used to improve the operation or performance of the appliance. Indeed, the methods described herein may use any or all of these techniques interchangeably to improve image analysis process and facilitate improved appliance performance and consumer satisfaction. The image processing algorithms and machine learning image recognition processes described herein are only exemplary and are not intended to limit the scope of the present subject matter in any manner.

In some embodiments, the analysis of the image and user identification, e.g., the determination that the detected user is a protected user, may be performed using a protected user detection software. The protected user detection software may be built by a remote server, e.g., in the cloud, and may further be updated and/or rebuilt with additional inputs at subsequent user detections. For example, the protected user detection software may be trained using one or more user inputs. Thus, in some embodiments, e.g., at initial or prior user detection events, the determination that the detected user is a protected user may include receiving a user input that indicates the detected user is a protected user. Such user input may include a user confirmation provided in response to the notification, such as a confirmation or verification that the protected user was identified correctly.

When the oven appliance receives such user input(s) and thus determines that the user is a protected user, the oven appliance may then gather data, e.g., obtain images with one or more cameras. The oven appliance may also or instead gather such data in response to an incorrect detection. The gathered data may be used to rebuild or update the protected user detection software. For example, the protected user detection software may be built by a remote server, e.g., in the cloud, and downloaded by the oven appliance, such as transmitted from the remote server and received by the oven appliance. Then, at a subsequent protected user detections (which may be determined automatically, e.g., by analyzing sensor input such as camera images, and/or based on manual user input) additional data may be gathered and such additional data may be sent to the cloud, such as transmitted from the oven appliance and received by the remote server. The remote server may then use the additional data to update and/or rebuild the protected user detection software. The updated protected user detection software may then be transmitted to, e.g., re-downloaded by, the oven appliance. Accordingly, the protected user detection software may be continuously updated and the accuracy of the protected user detection software may be continuously improved with additional data. In particular, the remote server may be in communication with numerous oven appliances, may receive data from multiple of the oven appliances, and may update the protected user detection software based on all the data from the multiple oven appliances.

Thus, in some embodiments, method 400 may also include transmitting the input obtained from the camera at step 430 to a remote server from the oven appliance after receiving the user input. In such embodiments, method 400 may further include building a protected user detection software by the remote server based on the input obtained from the camera. The protected user detection software may then be transmitted from the remote server to the oven appliance.

Further embodiments may include both initially downloading the protected user detection software from the remote server prior to detecting the protected user, followed by uploading the input obtained at step 430, e.g., transmitting the images obtained from the camera, to the remote server from the oven appliance after identifying the protected user (by analyzing the input locally and/or by receiving a user input indicating that the detected user is a protected user). Thus, the protected user detection software may then be updated or rebuilt by the remote server, and the updated or rebuilt protected user detection software may be downloaded by the oven appliance for use in a subsequent cooking operation.

In some exemplary embodiments, method 400 may further include sending a notification to a remote user interface device after determining that the detected user is a protected user. The method 400 may then include receiving a response to the notification. In particular, when the response is a negative response, e.g., when the response is or includes an incorrect detection input (such as a selection of "NO" in response to a prompt), method 400 may include, after receiving the incorrect decision input, transmitting the one or more images to the remote computing device from the oven appliance. In such embodiments or instances, the method 400 may then include updating the protected user detection software by the remote computing device based on the one or more transmitted (e.g., uploaded) images and then downloading the updated protected user detection software from the remote computing device to the oven appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating an oven appliance, the oven appliance comprising a camera assembly operable to obtain an image, the method comprising:
    downloading a protected user detection software from a remote computing device to the oven appliance;
    initiating a cooking operation of the oven appliance;
    detecting, with the camera assembly, a user at the oven appliance after initiating the cooking operation; and
    determining, using the protected user detection software, that the detected user is a protected user, wherein the protected user is not suitable for unsupervised operation of the oven appliance.

2. The method of claim 1, further comprising sending a notification to a remote user interface device after determining that the detected user is the protected user.

3. The method of claim 2, further comprising receiving a response to the notification.

4. The method of claim 3, wherein the response comprises an incorrect detection input.

5. The method of claim 4, wherein detecting the user at the oven appliance comprises obtaining one or more images with the camera assembly, wherein determining that the user is the protected user is based on the one or more images, further comprising, after receiving the incorrect decision input, transmitting the one or more images to the remote computing device from the oven appliance.

6. The method of claim 5, further comprising updating the protected user detection software by the remote computing device based on the one or more images, and downloading the updated protected user detection software from the remote computing device to the oven appliance.

7. The method of claim 1, further comprising activating an alarm after determining that the detected user is the protected user.

8. The method of claim 1, wherein the camera assembly is mounted within a cabinet of the oven appliance and is positioned and oriented with an area in front of the cabinet within a field of vision of the camera assembly.

9. The method of claim 1, further comprising, prior to initiating the cooking operation, receiving an image of the protected user.

10. An oven appliance, comprising:
a camera assembly operable to obtain an image; and
a controller, the controller operable for:
downloading a protected user detection software from a remote computing device to the oven appliance;
initiating a cooking operation of the oven appliance;
detecting, with the camera assembly, a user at the oven appliance after initiating the cooking operation; and
determining, using the protected user detection software, that the detected user is a protected user, wherein the protected user is not suitable for unsupervised operation of the oven appliance.

11. The oven appliance of claim 10, wherein the controller is further operable for sending a notification to a remote user interface device after determining that the detected user is the protected user.

12. The oven appliance of claim 11, wherein the controller is further operable for receiving a response to the notification.

13. The oven appliance of claim 12, wherein the response comprises an incorrect detection input.

14. The oven appliance of claim 13, wherein the controller is operable for detecting the user at the oven appliance by obtaining one or more images with the camera assembly, and is operable for determining that the user is the protected user based on the one or more images, wherein the controller is further operable for, after receiving the incorrect decision input, transmitting the one or more images to the remote computing device.

15. The oven appliance of claim 14, wherein the controller is further operable for downloading an updated protected user detection software from the remote computing device after transmitting the one or more images to the remote computing device.

16. The oven appliance of claim 10, wherein the controller is further operable for activating an alarm after determining that the detected user is the protected user.

17. The oven appliance of claim 10, the camera assembly is mounted within a cabinet of the oven appliance and is positioned and oriented with an area in front of the cabinet within a field of vision of the camera assembly.

18. The oven appliance of claim 10, wherein the controller is further operable for, prior to initiating the cooking operation, receiving an image of the protected user.

* * * * *